US009838436B2

United States Patent
(12) United States Patent
Michaels

(10) Patent No.: US 9,838,436 B2
(45) Date of Patent: Dec. 5, 2017

(54) AIRCRAFT DATA NETWORKS

(71) Applicant: Gulfstream Aerospace Corporation, Savannah, GA (US)

(72) Inventor: Charles Michaels, Savannah, GA (US)

(73) Assignee: Gulfstream Aerospace Corporation, Savannah, GA (US)

(*) Notice: Subject to any disclaimer, the term of this patent is extended or adjusted under 35 U.S.C. 154(b) by 208 days.

(21) Appl. No.: 14/672,639

(22) Filed: Mar. 30, 2015

(65) Prior Publication Data

US 2016/0294882 A1 Oct. 6, 2016

(51) Int. Cl.

*G06F 15/173* (2006.01)
*H04L 29/06* (2006.01)
*H04L 12/40* (2006.01)
*H04L 12/46* (2006.01)
*H04L 29/08* (2006.01)

(52) U.S. Cl.

CPC .......... *H04L 65/1013* (2013.01); *H04L 12/40* (2013.01); *H04L 12/462* (2013.01); *H04L 67/12* (2013.01); *H04L 2012/4028* (2013.01)

(58) Field of Classification Search

None

See application file for complete search history.

(56) References Cited

U.S. PATENT DOCUMENTS 7,505,400 B2 * 3/2009 Bibby .................. G05D 1/0077 370/217
7,558,903 B2 * 7/2009 Kinstler ............. G06F 13/4027 710/306
7,698,025 B1 4/2010 Cornell et al.
8,600,584 B2 * 12/2013 Fervel ..................... B64C 13/50 701/3
8,730,791 B2 * 5/2014 Mann ................ H04L 12/40169 370/217
2006/0293805 A1 * 12/2006 Garcia .................. B60T 8/1703 701/16
2007/0046680 A1 * 3/2007 Hedrick ................. G01C 23/00 345/503
2007/0127521 A1 * 6/2007 Sandell ................... H04L 25/05 370/466
2010/0250033 A1 9/2010 Ingram et al.
2011/0066305 A1 * 3/2011 Lin ....................... B64C 13/503 701/3

(Continued)

*Primary Examiner* — Younes Naji

(74) *Attorney, Agent, or Firm* — LKGlobal | Lorenz & Kopf, LLP

(57) ABSTRACT

An aircraft data network is provided that can include a first Remote Data Concentrator (RDC), a network switch and a second RDC. The first RDC can receive one or more input signals comprising data from a transmitting system, and translate the data per a network protocol to generate translated data having a format in accordance with the network protocol. The network switch can receive the translated data from the first RDC, determine a destination for at least some of the translated data, and route at least some of the translated data toward a first receiving system. The second RDC can receive at least some of the translated data from the network switch, convert at least some of the translated data to generate converted data having a format designed for use by the first receiving system, and communicate the converted data to the first receiving system.

20 Claims, 5 Drawing Sheets

(56) References Cited

U.S. PATENT DOCUMENTS

2013/0166111 A1* 6/2013 Ruckes .................. B64C 19/00
701/3
2013/0173828 A1* 7/2013 Todd .................... G06F 3/0659
710/5
2014/0117154 A1* 5/2014 Olive .................... B64D 43/00
244/1 R
2016/0318626 A1* 11/2016 Gansmandel ....... H04L 12/6418

* cited by examiner

300
First Receiving System
Second Receiving System
Third Receiving System
Fourth Receiving System
380-1
380-2
380-3
380-4
Remote Data Concentrator
340-2
Remote Data Concentrator
340-3
325-1
325-2
325-3
325-4
Network Switch
350
Transmitting System
320-1
Remote Data Concentrator
340-1
Redundant Transmitting System
320-2
330-1
330-2

AIRCRAFT DATA NETWORKS

TECHNICAL FIELD

Embodiments of the present invention generally relate to aircraft, and more particularly relate to data network architectures for an aircraft.

BACKGROUND OF THE INVENTION

Modern aircraft can include a data network that includes a number of transmitting systems that transmit data over the data network to a number of different receiving systems that consume the data. Typically, each transmitting system is directly coupled to one or more receiving systems via direct wired connections to each of the receiving systems so that each transmitting system can transmit data over a wire to the receiving systems that it is coupled to. As such, any receiving system that wants to receive data from one of the transmitting systems has to be directly wired to that transmitting system to receive data from that transmitting system.

One drawback of using direct wired connections between each transmitting system and each receiving system is that the transmitting systems and receiving systems can be located throughout the aircraft. For example, some of the transmitting systems can be located relatively far away from the receiving systems that they are coupled to (e.g., one system may be located in the front of the aircraft and the other may be located in the back end of the aircraft). When a receiving system is located a great distance away from the transmitting systems (or vice-versa), the wire runs needed to wire the receiving system to each transmitting systems can be significantly long. This not only adds cost and weight to the aircraft, but also significantly increases manufacturing and maintenance complexity.

For safety reasons, an aircraft is usually designed to include one or more redundant versions of each transmitting system and one or more redundant versions of the primary data network that is used to couple each of the redundant transmitting systems to corresponding receiving systems. When redundant data networks are employed, the wiring burden increases even more. In addition, because each redundant data network(s) is usually identical to the primary data network, the presence of redundant data networks does not necessarily ensure that they will always be available as a backup. For example, common mode faults may impact both the primary data network and the redundant data network(s) such that both may have the same operational issue(s) and do not operate as intended (e.g., a software bug that impacts both networks).

There is a need for an aircraft that includes an improved data network for communicating critical data to various receiving systems located throughout the aircraft. It would be desirable to eliminate at least some of the wiring needed in such a data network. For instance, it would be desirable to reduce the amount and length of wiring that is required to communicatively couple each of the various transmitting systems to each of the various receiving systems. It would also be desirable to provide alternative paths for communication of critical data between the various transmitting systems and the various receiving systems. Furthermore, other desirable features and characteristics of the present invention will become apparent from the subsequent detailed description and the appended claims, taken in conjunction with the accompanying drawings and the foregoing technical field and background.

SUMMARY

The disclosed embodiments relate to an aircraft that includes an aircraft data network. The aircraft data network can include a first Remote Data Concentrator (RDC), a network switch and a second RDC. The first RDC can receive one or more input signals comprising data from a transmitting system, and translate the data per a network protocol to generate translated data having a format in accordance with the network protocol. The network switch can receive the translated data from the first RDC, determine a destination for at least some of the translated data, and route at least some of the translated data toward a first receiving system. The second RDC can receive at least some of the translated data from the network switch, convert at least some of the translated data to generate converted data having a format designed for use by the first receiving system, and communicate the converted data to the first receiving system.

DESCRIPTION OF THE DRAWINGS

Embodiments of the present invention will hereinafter be described in conjunction with the following drawing figures, wherein like numerals denote like elements.

DESCRIPTION OF EXEMPLARY EMBODIMENTS

Figure 1:
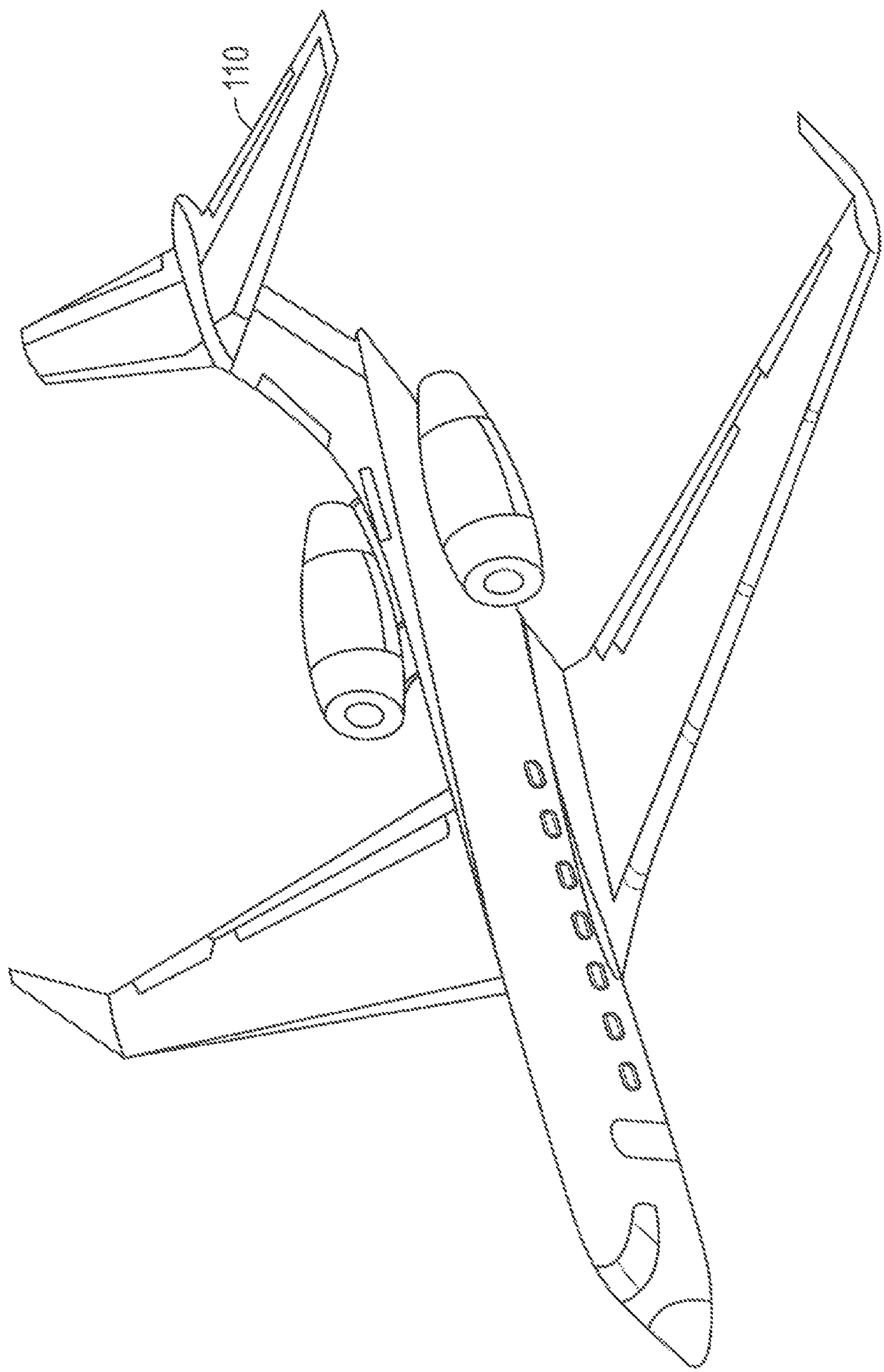
FIG. 1 is a perspective view of an aircraft in which the disclosed embodiments can be implemented in accordance with one non-limiting implementation.

As used herein, the word “exemplary” means “serving as an example, instance, or illustration.” The following detailed description is merely exemplary in nature and is not intended to limit the invention or the application and uses of the invention. Any embodiment described herein as “exemplary” is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary or the following description.

Overview

The disclosed embodiments relate to various aircraft data network architectures that employ dual dissimilar networks. These architectures include at least one transmitting system that is the source of critical data, and a plurality of receiving systems that are consumers of that critical data.

As used herein, the term "critical data" refers to any data that is used by a receiving system to allow that receiving system to perform communication, navigation or aviation functions. For example, critical data can be communication data that is used by a receiving system to perform a communication function, navigation data that is used by a receiving system to perform a navigation function; or aviation data that is used by a receiving system to perform an aviation function. For example, critical data can be data provided from a transmitting system such as an attitude heading and reference system (AHRS), inertial reference system (IRS), and/or air data system (ADS) to a flight control computer to help aid in aviation functions performed by the flight control computer. Alternatively, critical data can be data provided from a navigation system such as GPS system to help aid in aviation functions performed by a display in the cockpit of the aircraft. Another example would be the VHF and HF radios used to perform the communication function between the flight crew and Air Traffic Control.

Critical data is "critical" because if it is missing or erroneous, this can prevent that receiving system from performing its intended communication, navigation or aviation functions.

In accordance with the disclosed embodiments, the disclosed aircraft data network architectures also include remote data concentrators along with network switches to help alleviate the wiring burden in an aircraft data network. The remote data concentrators can be distributed at various locations through the aircraft. The remote data concentrators serve as locations where data from multiple transmitting systems can be concentrated for distribution to the various receiving systems that consume that data. Each of the various receiving systems can each be communicatively coupled to one or more of the remote data concentrators so that receiving system can receive data from both the primary transmitting system and any redundant versions of that transmitting system. This way, the same data can be shared by multiple receiving systems (each being connected to one of the RDCs) without the need for directly wiring each individual receiving system to each particular transmitting system.

In some embodiments, each primary transmitting system has one or more redundant transmitting system(s) that is another source of critical data, and each of the receiving systems that consume the critical data can receive that critical data from the primary transmitting system and each redundant transmitting system.

When the network includes multiple transmitting systems (and hence multiple redundant transmitting systems) and a receiving system needs to receive data from each of the multiple transmitting systems, the benefits of implementing RDCs is even more apparent since the receiving system can receive data from each of the multiple transmitting systems and each of the multiple redundant transmitting systems through a single RDC. In other words, the receiving system can be communicatively coupled to one RDC and simply receive the data that it needs from each of the transmitting systems and each of the redundant transmitting systems. The receiving system can then compare the received data from one of the transmitting systems and its corresponding redundant transmitting system to validate the data received from each to make sure data is valid.

One benefit of the disclosed aircraft data network architectures is that they can eliminate the need to directly interface between an aircraft's transmitting systems and each of the aircraft's receiving systems, and therefore can greatly reduce the wiring that would otherwise be needed. This not only reduces manufacturing costs, but also decreases the weight of the aircraft.

Another benefit of the disclosed aircraft data network architectures is that they can provide dissimilar paths for the same critical data through the aircraft data network. This can reduce/eliminate the possibility of common mode faults. The aircraft's receiving systems (that consume that critical data) will have at least two sources for that critical data, and each of the two sources will transport that critical data over different, dissimilar paths.

FIG. 1 is a perspective view of an aircraft 110 in which the disclosed embodiments can be implemented in accordance with one exemplary, non-limiting implementation. Although not shown in FIG. 1, the aircraft 110 also includes various onboard computers, aircraft instrumentation, and various control systems that will now be described with reference to FIG. 2-5. The aircraft includes various primary flight control surfaces and secondary flight control surfaces. Each flight control surface typically has one or more actuators for controlling its movement. An actuator control unit transmits control signals to actuators. The actuators generate signals that control movement of the various flight control surfaces of the aircraft in accordance with the control signals.

Figure 2:
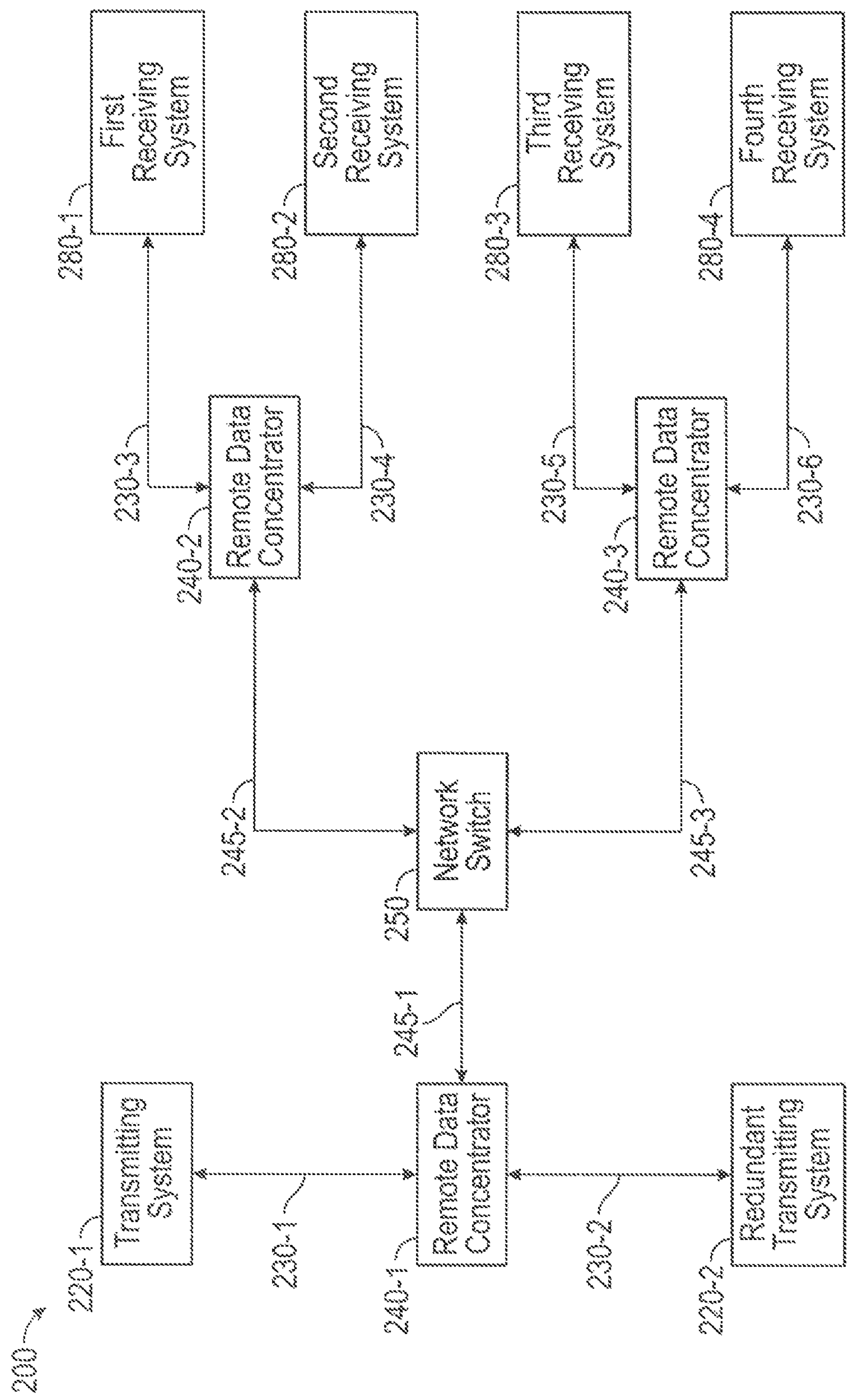
FIG. 2 is a simplified block diagram of an aircraft data network in accordance with one implementation of the disclosed embodiments.

FIG. 2 is a simplified block diagram of an aircraft data network 200 in accordance with one implementation of the disclosed embodiments. The aircraft data network 200 includes a transmitting system 220-1, a redundant transmitting system 220-2, a first Remote Data Concentrator (RDC) 240-1, a second RDC 240-2, a third RDC 240-3, a network switch 250, a first receiving system 280-1, a second receiving system 280-2, a third receiving system 280-3, and a fourth receiving system 280-4. In one non-limiting implementation, it can be assumed that the first RDC 240-1 is located relatively far away from the second RDC 240-2 and the third RDC 240-3. For instance, in one implementation it can be assumed that the first RDC 240-1 is located in the frontend of aircraft and that the second RDC 240-2 and the third RDC 240-3 are located at the backend of the aircraft.

It is noted that FIG. 2 is a simplified representation of one implementation of the aircraft data network 200 and that in other implementations, additional transmitting systems, receiving systems, RDCs, and network switches can be included. In this regard, in some embodiments, each of the transmitting systems 220-1, 220-2 can represent multiple, distinct transmitting systems. For instance, in one embodiment, the transmitting system 220-1 can represent transmitting systems including, for example, an attitude heading and reference system (AHRS), inertial reference system (IRS), air data system (ADS), communication systems, etc. Similarly, in some embodiments, each of the receiving systems 280 can represent multiple, distinct receiving systems. Further, in some embodiments, each of the RDCs can represent multiple, distinct RDCs.

In some embodiments, the aircraft data network 200 can include additional transmitting systems (not illustrated for sake of simplicity) and the first RDC 240-1 can be coupled to those additional transmitting systems. Likewise, the second RDC 240-2 and the third RDC 240-3 can each be coupled to additional receiving systems (not illustrated for sake of simplicity). In some embodiments, the aircraft data network 200 can include additional RDCs and additional network switches (not illustrated for sake of simplicity). For instance, the network switch 250 can be coupled to additional RDCs (not illustrated for sake of simplicity).

In FIG. 2, the transmitting systems 220-1, 220-2 are communicatively coupled to the first RDC 240-1 by a first connection 230-1 and a second connection 230-2, respectively. The receiving systems 280-1, 280-2 are communicatively coupled to RDC 240-2 by connections 230-3, 230-4, and receiving systems 280-3, 280-4 are communicatively coupled to RDC 240-3 by connections 230-5, 230-6. In one embodiment, the connections 230 can be direct wired connections, and in another embodiment, where the RDCs 240 and network switch 250 have wireless communication capability, the connections 230 can be wireless communication links. The first RDC 240-1 is communicatively coupled to the network switch 250 by a data bus 245. The network switch 250 is coupled to the second RDC 240-2 by a data bus 245-2, and to the third RDC 240-3 by a data bus 245-3.

Both transmitting systems 220-1, 220-2 send data to the first RDC 240-1. Although it is illustrated using a single block in FIG. 2, the transmitting system 220-1 can represent several different systems, and therefore, the first RDC 240-1 receives different incoming signals from each transmitting system. In other words, the incoming signals received by the RDC 240-1 can be different signals coming from the various transmitting systems that are represented by transmitting system 220-1. These different incoming signals can be in discrete, analog or digital form.

As used herein, the term "remote data concentrator (RDC)" can refer to a microprocessor-based controller that converts input data from one form to another before outputting it. In one embodiment, a RDC can receive input data (in discrete, analog or digital form) from a variety of different transmitting systems. The RDC can process and reformat the input data into a common digital data format so that it can be communicated over a network. For example, a RDC is a protocol converter that can convert incoming input signals per a network protocol such as EIA/TIA-232, EIA/TIA-422, EIA/TIA-485, ARINC 429, USB 2.0, ARINC-664, MIL-STD-1553, CAN bus and Ethernet. In addition, an RDC can receive data that has been converted per the network protocol, and convert the converted data back into a form that is useable by the various receiving systems before communicating to the various receiving systems.

In one embodiment, the first RDC 240-1 translates the input data (e.g., converts the data per a network protocol) into translated data so that it can be processed and routed by the network switch 250. The first RDC 240-1 converts the incoming signals per a network protocol (e.g., a particular digital bus protocol) into one composite, outgoing signal (or data stream) that is suited for the bus 245 (e.g., ARINC 429 and/or Ethernet data buses). The outgoing signal is a stream of digital data formatted per a certain network protocol. Thus, the first RDC 240-1 "concentrates" the incoming data into an outgoing signal that includes all of the translated data. The first RDC 240-1 communicates the translated data over bus 245-1 to the network switch 250. Some of this translated data is intended for receiving system 280-1, and some of this translated data is intended for the other receiving system 280-2.

In other embodiments, where the network switch 250 and one or both of the RDCs 240-2, 240-3 are not employed, the first RDC 240-1 can be directly connected to one or more of the various receiving systems 280. In such embodiments, the first RDC 240-1 can perform additional functionality to convert incoming signals received from the transmitting systems 220 so that data received from the transmitting systems into an appropriate signal type or format (e.g., data word type) that is utilized by (or required by) the receiving aircraft systems 280 (e.g., that can be read and processed by the receiving aircraft systems 280) before communicating it to the various receiving systems. In other words, if required, the first RDC 240-1 can reformat the data received from the transmitting systems 220 into a data type needed by each of the receiving systems 280, and communicate that data directly to the appropriate receiving system 280. For example, in one embodiment, the first RDC 240-1 can have configuration files loaded that describe the transmitting system and the receiving system for certain data and how that data needs to be processed and re-formatted prior to sending it to the intended receiving system.

Referring now again to the specific implementation shown in FIG. 2 (that employs the network switch 250 and the RDCs 240-2, 240-3), it is noted that the term "network switch" can refer to a networking device that connects aircraft systems together and performs switching functions with respect to data communicated between those devices. A network switch receives incoming data, processes it, and forwards the processed data along a path to its intended destination. In FIG. 2, the network switch 250 is configured to: read translated data, determine its destination and a path to that destination (e.g., a particular receiving system), and route the translated data along a path the appropriate destination. In this embodiment, at least some of the translated data is routed to the second RDC 240-2 and the third RDC 240-3.

The second RDC 240-2 and the third RDC 240-3 each translate (or convert) the data received from the network switch 250 into a signal type or format (e.g., data word type) that is utilized by the receiving aircraft systems 280 (e.g., that can be read and processed by the receiving aircraft systems 280). The second and third RDCs 240-2, 240-3 can receive data that has been converted per the network protocol, and convert the converted data back into a form that is required by the various receiving systems before communicating it to the various receiving systems. In other words, the second RDC 240-2 and the third RDC 240-3 reformat the data received from the network switch 250 into a data type needed by each of the receiving systems, and communicate that data to the appropriate receiving system. For example, in one embodiment, the second and third RDCs 240-2, 240-3 each have configuration files loaded that describe the transmitting system and the receiving system for certain data and how that data needs to be processed and re-formatted prior to sending it to the intended receiving system.

One issue with this particular architecture is that RDCs 240 and the network switch 250 must each operate correctly because they are the only links along a path between a particular transmitting system 220 and a particular receiving system 280. If one of the RDCs 240 or the network switch 250 operates incorrectly or fails for some reason, the receiving systems 280 may not receive data being communicated from the transmitting systems 220. This can be important especially when the data being communicated from the transmitting systems 220 is "critical" data. Another issue with this particular architecture is that RDCs 240 and network switches (when more than one is present) may be subject to a common mode of fault (e.g., RDCs 240 might also be subject to a common software bug) where all of the RDCs 240 or network switches fail to operate as intended (e.g., communicate data to the wrong receiving system).

To address these issues with the aircraft data network 200, in one embodiment additional transmitting systems, receiving systems, RDCs, and network switches are included for redundancy. In other words, a separate network is provided that includes a redundant network switch (not illustrated)

similar or identical to network switch 250 and redundant RDCs (not illustrated) similar or identical to the RDCs 240-1, 240-2, 240-3 to provide two separate, alternative pathways for data that is communicated between the transmitting systems 220 and the receiving systems 280. In one embodiment, a redundant network switch (not illustrated) is provided that is identical to network switch 250 and redundant RDCs (not illustrated) are provided that are identical to the RDCs 240-1, 240-2, 240-3 to provide two separate, alternative pathways for data that is communicated between the transmitting systems 220 and the receiving systems 280. In another embodiment, a redundant network switch (not illustrated) is provided that is similar to network switch 250 and redundant RDCs (not illustrated) are provided that are similar to the RDCs 240-1, 240-2, 240-3 to provide two separate, alternative pathways for data that is communicated between the transmitting systems 220 and the receiving systems 280. To reduce the likelihood of common mode faults, the redundant network switch (not illustrated) and the redundant RDCs (not illustrated) are functionally similar to the network switch 250 and RDCs 240-1, 240-2, 240-3 except that the redundant network switch (not illustrated) and the redundant RDCs (not illustrated) employ different hardware and/or software in comparison to the network switch 250 and RDCs 240-1, 240-2, 240-3, respectively. One such implementation will be described below with reference to FIG. 4. Further, in other embodiments that will be described with reference to FIG. 5, multiple network switches and RDCs can be implemented so that there are multiple distinct pathways for data that is communicated between the transmitting systems 220 and the receiving systems 280.

Figure 3:
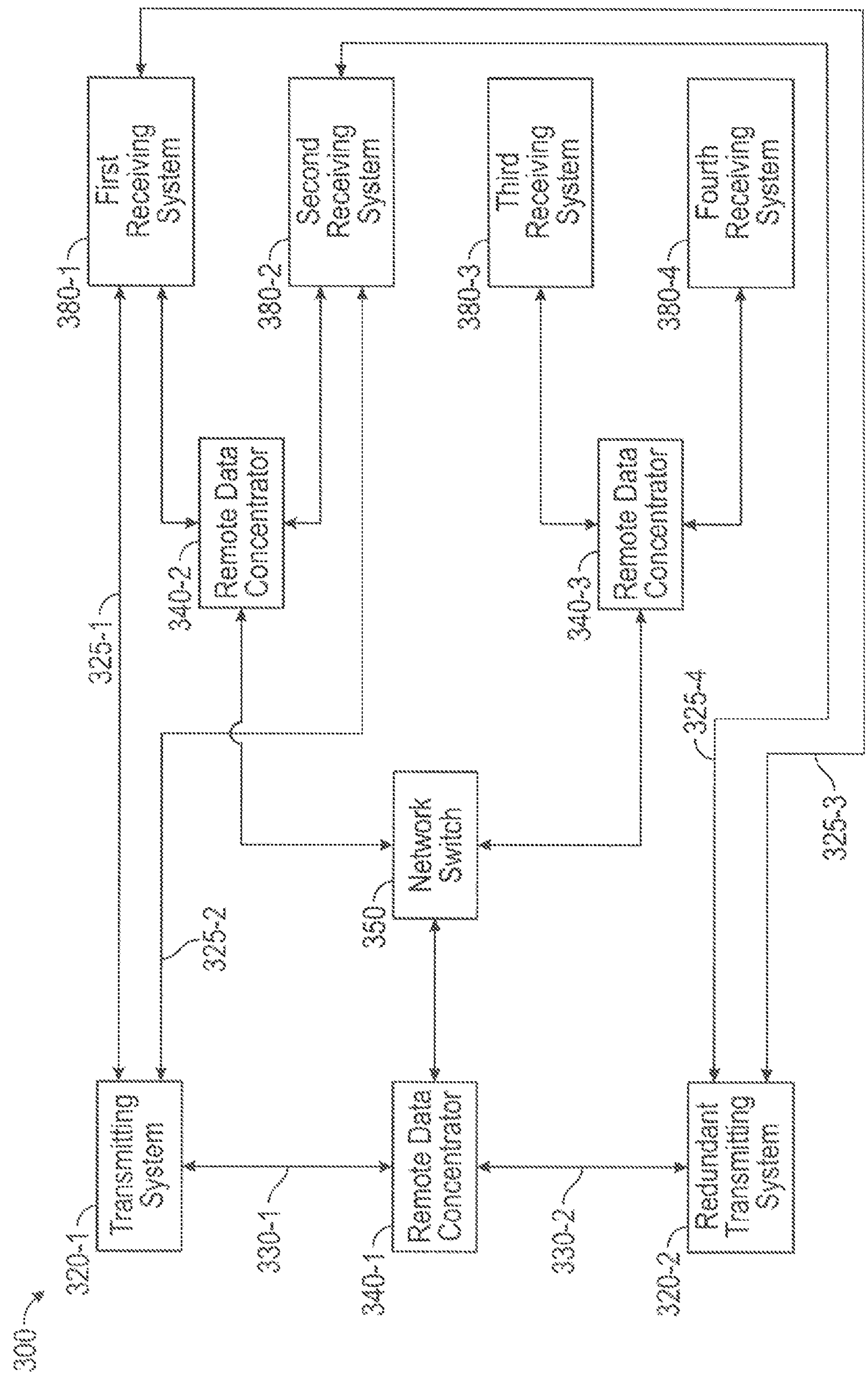
FIG. 3 is a simplified block diagram of an aircraft data network in accordance with another implementation of the disclosed embodiments.
Figure 4:
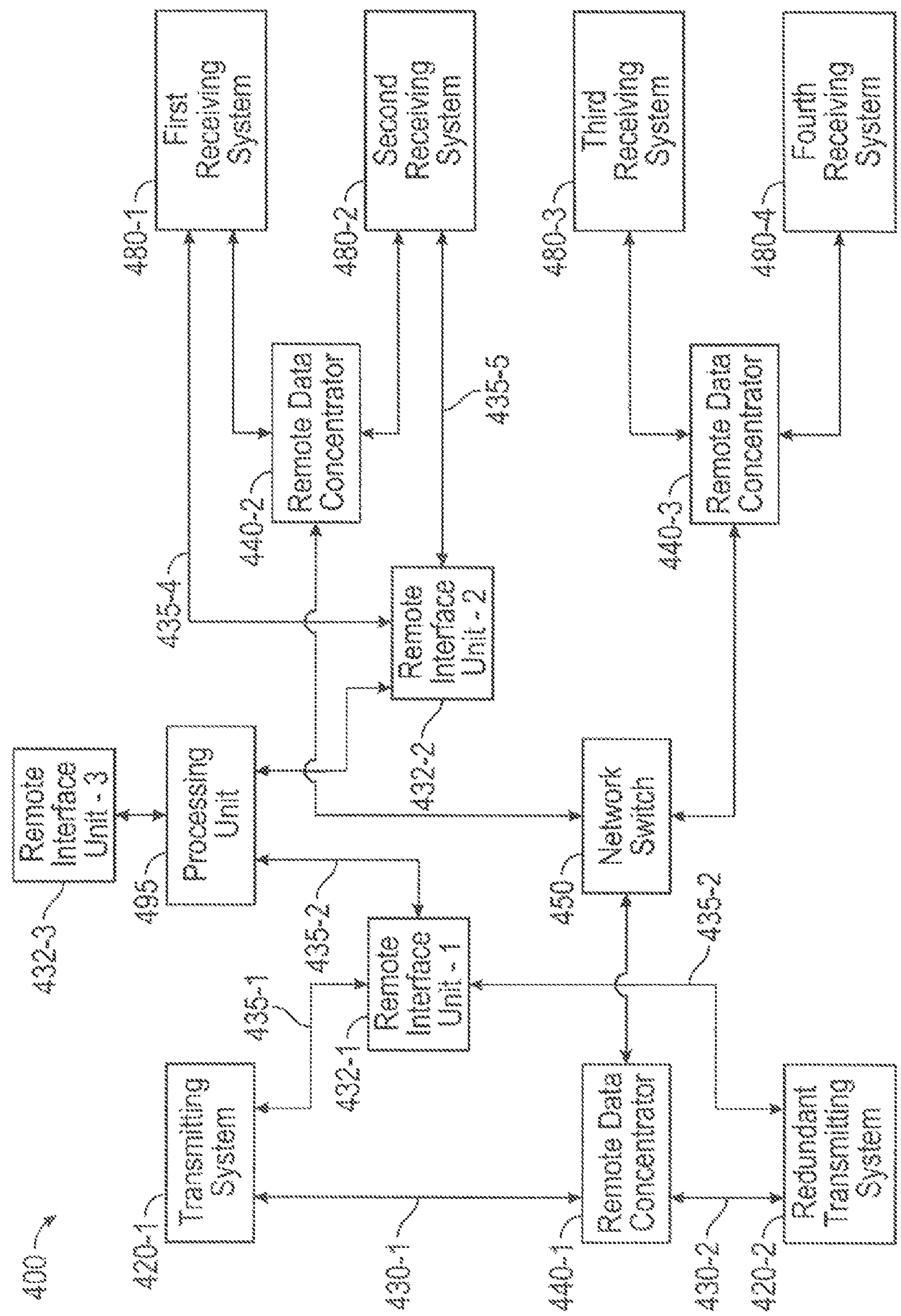
FIG. 4 is a simplified block diagram of an aircraft data network in accordance with yet another implementation of the disclosed embodiments.

It is desirable to provide other architectures that can provide alternative paths for communication of critical data to protect against common mode faults along the primary path between the transmitting systems 220 and the receiving systems 280. In accordance with one embodiment, these alternative paths can be provided as shown in FIG. 3. In accordance with other embodiments, these alternative paths can be provided as shown in FIG. 4.

FIG. 3 is a simplified block diagram of an aircraft data network 300 in accordance with another implementation of the disclosed embodiments. The aircraft data network 300 of FIG. 3 includes the same blocks, components or elements as the aircraft data network 200 of FIG. 2. In FIG. 3, the same blocks, components or elements are identified using corresponding reference numerals but with a 300 number series instead of a 200 number series. The description of each element in FIG. 2 applies to the same blocks, components or elements in FIG. 3. For sake of brevity, the description of each of the elements in FIG. 3 will not be repeated.

This embodiment differs from FIG. 2 in that it also includes a plurality of direct wired connections 325-1 . . . 325-4 for communicating data (e.g., critical data) from the transmitting systems 320 to the receiving systems 380-1, 380-2. Although not illustrated for sake of clarity, it should be appreciated that additional direct wired connections could also be provided between the receiving systems 380-3, 380-4 and the transmitting systems 320. The direct wired connections 325-1 . . . 225-4 provided alternate paths for the data that are not subject to the same fault modes as the paths that are illustrated in FIG. 2. For example, if one of the RDC 340-1 or 340-2 does not operate as intended, then data that was supposed to be routed through those RDCs to the receiving systems 380-1, 380-2 can still be delivered via one of the direct wired connections 325-1 . . . 325-4 between the transmitting systems 320 and receiving systems 380-1, 380-2.

One drawback with this approach is that due to the locations of the transmitting systems 320 and receiving systems 380 on the aircraft, the lengths of some (or all) of the wires used to implement the direct wired connections 325-1 . . . 325-4 between the transmitting systems 320 and receiving systems 380 can be significant. For example, direct wired connection 325-1 and 325-4 can be used for communicating data from the transmitting systems 320-1, 320-2 directly to the receiving system 380-1, but need to be routed between the transmitting systems 320-1, 320-2 to the receiving system 380-1. This can add significant weight to the aircraft among other technical issues associated with directly wiring two systems that can be located far away from each other in the aircraft. As such, it would be desirable to provide an alternative architecture that can help address these issues and help eliminate some of the wiring that would be required.

FIG. 4 is a simplified block diagram of an aircraft data network 400 in accordance with yet another implementation of the disclosed embodiments.

The aircraft data network 400 includes a transmitting system 420-1, a redundant transmitting system 420-2, a first Remote Interface Unit (RIU) 432-1, a second RIU 432-2, a third RIU 432-3, a first Remote Data Concentrator (RDC) 440-1, a second RDC 440-2, a third RDC 440-3, a network switch 450, a first receiving system 480-1, a second receiving system 480-2, a third receiving system 480-3, a fourth receiving system 480-4, and a processing unit 495. The aircraft data network 400 of FIG. 4 includes some of the same blocks, components or elements as the aircraft data network 200 of FIG. 2. In FIG. 4, the same blocks, components or elements are identified using corresponding reference numerals but with a 400 number series instead of a 200 number series. The description of each element in FIG. 2 applies to the same blocks, components or elements in FIG. 4. For sake of brevity, the description of each of the elements in FIG. 4 will not be repeated.

In contrast to FIG. 2, the aircraft data network 400 of FIG. 4 includes a first RIU 432-1, a second RIU 432-2, and a processing unit 495. Each of the RIUs can perform the same or similar functions as an RDC, and the processing unit 495 can perform the same or similar functions as a network switch. In one embodiment, to reduce the likelihood of common mode faults, the processing unit 495 is "dissimilar to" the network switch 450, and the remote interface units 432 are "dissimilar to" RDCs 440-1, 440-2, 440-3. For example, in one implementation, these redundant components are dissimilar in that they may implement different hardware and/or software than the network switch 450 and the RDCs 440. For instance, the RIUs 432 can include hardware and/or software that is different than the hardware and/or the software of the RDCs 440. This dissimilarity is important because it helps ensure that the analogous components (e.g., RDCs 440 and RIUs 432) in each path are not necessarily subject to the same fault modes or operational errors. For example, faulty operation of network switch 450 does not necessarily impact operation of the processing unit 495, and faulty operation of the RIUs 432 does not necessarily impact operation of the RDCs 440. As such, two alternative, dissimilar paths are provided for critical data so that it can reach the appropriate receiving system in the event one communication path does not operate as intended.

In FIG. 4, the transmitting systems 420 also send signals that include critical data to the first RIU 432-1. The first RIU 432-1 receives the input signals comprising critical data and translates (or converts) the critical data per a network protocol to generate translated critical data having a format in accordance with the network protocol. The processing unit 495 is communicatively coupled to the first RIU 432-1 via a bus, and the first RIU 432-1 sends the translated critical data to the processing unit 495 via the bus.

The processing unit 495 performs similar functions as the network switch 450 except that the processing unit 495 only receives "critical data" communicated from the transmitting system(s), whereas the network switch 450 receives all data communicated from the transmitting system(s). For example, the processing unit 495 receives the translated critical data from the first RIU 432-1, processes it to determine appropriate destinations (e.g., receiving system 480-1, 480-2, 480-3, 480-4) for the translated critical data, and then routes translated critical data, as appropriate, to the correct RIUs 432-2, 432-3 based on which one is in communication with the correct destination. As such the processing unit 495 also performs switching functions to ensure that certain translated critical data is communicated to the correct RIUs 432-2, 432-3. The processing unit 495 is a different type of switch that performs similar functions as the network switch, but is "dissimilar" in that is not susceptible to the same fault modes as the network switch 450. For example, the processing unit 495 can include different hardware and/or different software than the network switch 450.

The second RIU 432-2 receives at least some of the translated critical data from the processing unit 495 (e.g., the translated critical data that is destined for the receiving systems 480-1, 480-2 and any other receiving systems that the second RIU 43-2 is coupled to). The second RIU 432-2 converts the translated critical data that it receives to generate converted critical data having a format designed for use by the first receiving system 480-1 and a format designed for use by the second receiving system 480-2 (and any other receiving systems (not illustrated) that the second RIU 43-2 is coupled to). For example, the second RIU 432-2 can convert the translated critical data into converted critical data having the signal type (e.g., format) used by or needed for the receiving systems 480-1, 480-2. The second RIU 432-2 communicates the converted critical data via different signals to the receiving systems 480-1, 480-2. Thus, the aircraft data network 400 of FIG. 4 allows multiple receiving systems to be coupled to a single RIU and eliminates the need for direct wired connections between each of the transmitting systems 420 and the receiving systems 480. This reduces the amount of wiring on the aircraft. In addition, the first RIU 432-1, processing unit 495 and second RIU 432-2 provide an alternative communication path for communicating critical data between the first transmitting system 420-1 and the receiving systems 480-1, 480-2. This alternate communication path (provided by the first RIU 432-1, processing unit 495, and second RIU 432-2) is dissimilar to the communication path provided via the first RDC 440-1, the network switch 450, and the second RDC 440-2. To explain further, because the alternative communication paths for the critical data include different components they are dissimilar. This dissimilarity is beneficial in that the processing unit 495 is not subject to the same fault modes as the network switch 450 (e.g., software glitches or bugs, some hardware failures, such as software or hardware design errors not discovered in verification testing), and in that the RIUs 432 are not subject to the same fault modes as the RDCs 440-1, 440-2. As such, the risk of common mode faults can be reduced and/or eliminated.

Although not illustrated, the aircraft data network 400 can include additional processing units (like 495) and RIUs (like RIU 432-2) to perform similar functions with respect to the receiving systems 480-3, 480-4. Further, it should be appreciated that the processing unit 495 can be communicatively coupled to a number of additional RIUs (not illustrated) that are communicatively coupled to additional receiving systems (not illustrated). For example, the processing unit 495 can be communicatively coupled to RIU 432-3. Moreover, although not illustrated, additional receiving systems can be coupled to each of the additional RIUs. For instance, RIU 432-3 can be communicatively coupled to other receiving systems that are not illustrated for sake of simplicity.

Figure 5:
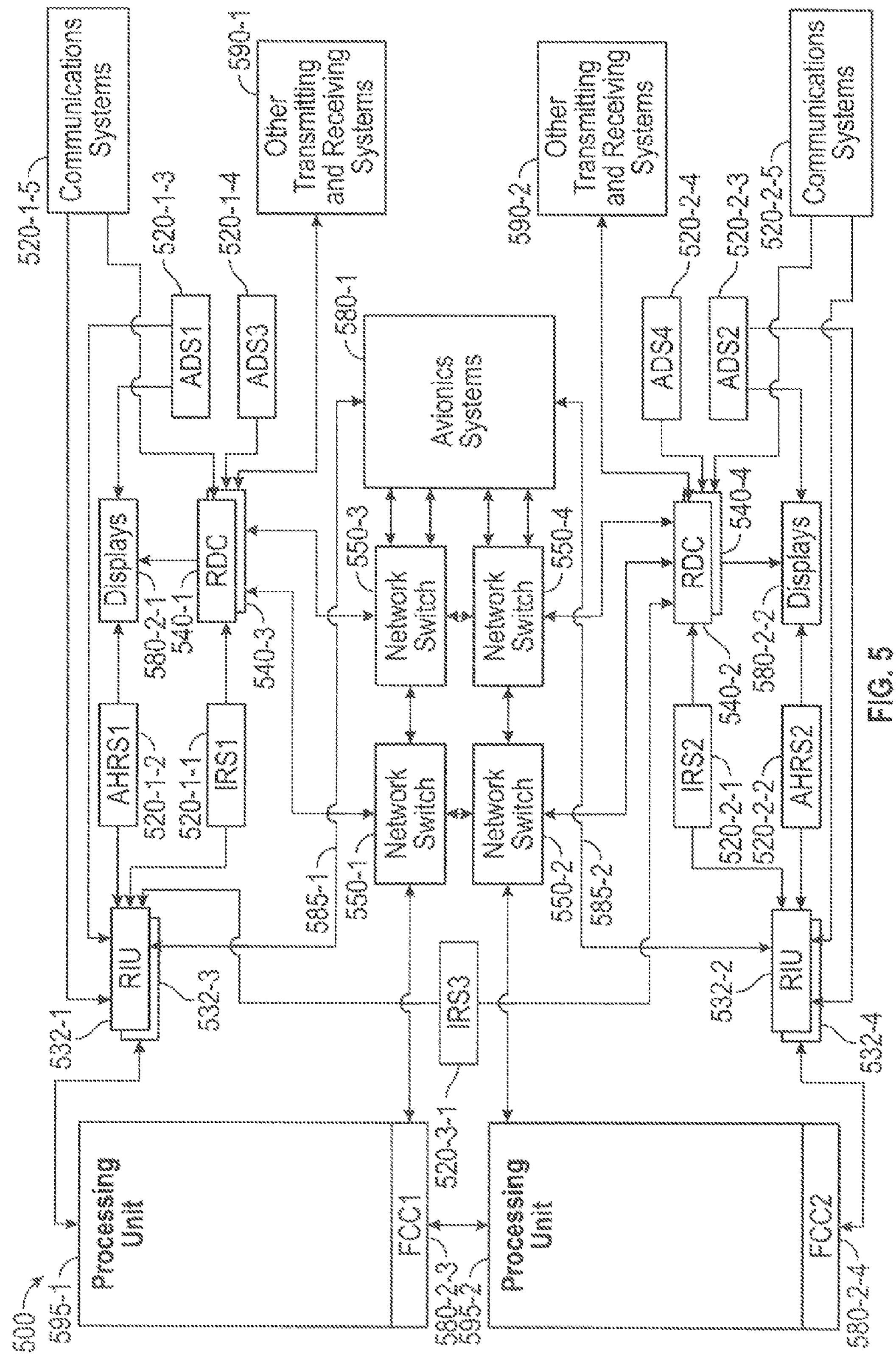
FIG. 5 is a simplified block diagram of an aircraft data network in accordance with another implementation of the disclosed embodiments.

Example Implementation of Critical Data Communication Between Transmitting and Receiving Systems FIG. 5 is a simplified block diagram of an aircraft data network 500 in accordance with another implementation of the disclosed embodiments.

The aircraft data network 500 of FIG. 5 includes transmitting systems 520, Remote Interface Units (RIUs) 532, Remote Data Concentrators (RDCs) 540, network switches 550, receiving systems 580. The aircraft data network 500 of FIG. 5 includes some of the same blocks, components or elements that are described above with reference to the aircraft data networks 200, 300, 400 of FIGS. 2-4, respectively. In FIG. 5, the same blocks, components or elements are identified using corresponding reference numerals, but with a 500 number series instead of a 200, 300 or 400 number series. Thus, for example, the RDCs 540 would correspond to the RDCs 240 of FIG. 2, the RDCs 340 of FIG. 3, and the RDCs 440 of FIG. 4, while the RIUs 532 would correspond to the RIUs 432 of FIG. 4, and the network switches 550 would correspond to the network switches 250, 350, 450 of FIGS. 2-4, respectively. In FIG. 5, multiple RDC blocks are shown together (e.g., RDC 540-1, 540-3) in the same location on the drawings; however, this does not mean that they are located in proximity to each other. For instance, RDC 540-3 can be located in a different part of the aircraft than RDC 540-1. For example, RDC 540-1 could be located near the front of the aircraft, whereas RDC 540-3 could be located near the back of the aircraft. Likewise, multiple RIU blocks are shown together (e.g., RIU 532-1, 532-3) in the same location on the drawings; however, this does not mean that they are located in proximity to each other. For instance, RIU 532-3 can be located in a different part of the aircraft than RIU 532-1. For example, RIU 532-1 could be located near the front of the aircraft, whereas RIU 532-3 could be located near the back of the aircraft. For sake of brevity, the entire description of each of the elements in FIGS. 2 through 4 will not be repeated. Rather, the description of each block, component or element in FIGS. 2-4 applies to similarly numbered blocks, components or elements in FIG. 5.

The aircraft data network 500 of FIG. 5 is illustrated to show specific, non-limiting examples of transmitting systems and receiving systems that are generically referred to in FIGS. 2-4. It should be appreciated that these examples are non-limiting and intended to show an exemplary architecture. As shown in FIG. 5, the transmitting systems 520 can include, for example, inertial reference systems 520-1-1, 520-2-1, 520-3-1, attitude heading and reference systems (AHRSs) 520-1-2, 520-2-2, air data systems (ADSs) 520-1-3, 520-2-3, 520-1-4, 520-2-4, and communication systems 520-1-5, 520-2-5. The receiving systems 580 can include, for example, avionics systems 580-1, displays 580-2-1, 580-2-2, flight control computers 580-2-3, 580-2-4 and other aircraft systems 590-1, 590-2. The other aircraft systems 590-1, 590-2 represent other aircraft systems that can receive data from transmitting systems, and that can also transmit data to receiving systems, and are therefore label as "other transmitting and receiving systems" in FIG. 5 since they are each intended to represent a plurality of other aircraft systems that can be transmitters and/or receivers of data. The other aircraft systems 590-1, 590-2 can represent examples of receiving systems that do not receive critical data, whereas all other receiving systems 580 do receive critical data from the transmitting systems 520.

Each of the inertial reference systems 520-1-1, 520-2-1, 520-3-1 includes devices, components and sensors such as gyroscope(s) (e.g., ring laser gyroscope(s)), accelerometer (s), Global Position System (GPS) receiver(s), and other motion sensor devices). For example, each of the inertial reference systems 520-1-1, 520-2-1, 520-3-1 can include ring laser gyroscope(s) and accelerometer(s) that can sense information that can be used to compute or generate inertial signal data that is provided to flight control computer 580-2-3, 580-2-4. The inertial signal data can generally include inertial flight data such as angular rates of the aircraft rates (e.g., angular rates of roll, pitch and yaw axes) and linear accelerations, as well as the aircraft attitude and velocity.

Like the inertial reference systems 520-1-1, 520-2-1, 520-3-1, the attitude heading and reference systems (AHRSs) 520-1-2, 520-2-2 each include sensor devices such as gyroscopes, accelerometers and/or magnetometers that are not illustrated for sake of simplicity. Each of the attitude heading and reference systems (AHRSs) 520-1-2, 520-2-2 also includes a processor and software for processing information from the various sensor devices to generate inertial flight control data that it provides to the flight control computers 580-2-3, 580-2-4. For example, in some implementations, each of the attitude heading and reference systems (AHRSs) 520-1-2, 520-2-2 includes three sensors for the three axes of the aircraft that can provide heading, attitude and yaw measurement data for each of the three axes of the aircraft. This heading, attitude and yaw measurement data can processed via a processor at the attitude heading and reference systems (AHRSs) 520-1-2, 520-2-2 to provide the inertial flight control data (e.g., rates, accelerations, attitude and heading measurement data) that can then be provided to the flight control computers 580-2-3, 580-2-4. Depending on the implementation, this inertial flight control data can include at least some of the inertial signal data that is described above with respect to the inertial reference systems 520-1-1, 520-2-1, 520-3-1. As such, in some embodiments, the inertial reference systems 520-1-1, 520-2-1, 520-3-1 and the attitude heading and reference systems (AHRSs) 520-1-2, 520-2-2 output substantially similar types of data (e.g., rates, accelerations, attitude and heading measurements). In other words, the inertial signal data and the inertial flight control data are "redundant" to a certain extent. The inertial flight control data from the attitude heading and reference systems (AHRSs) 520-1-2, 520-2-2 can be used to check or confirm the correctness of the inertial signal data that is output by the inertial reference systems 520-1-1, 520-2-1, 520-3-1.

The air data systems (ADSs) 520-1-3, 520-2-3, 520-1-4, 520-2-4 can include sensors such as air data sensors, air data reference (ADR) components or sensors, aircraft sensors (e.g., air speed indicator, altimeter, attitude indicator, gyroscope, magnetic compass, navigation instrument sensor, speed sensors, angular rate sensor, etc.), position, angle, displacement, distance, speed, acceleration sensors (e.g., accelerometer, inclinometer, position sensor, rotary encoder, rotary/linear variable differential transformer, tachometer, etc.), pitot and static pressure sensors that can be used to measure Ram air pressure and static pressures, acoustic sensors (e.g., sound, microphone, seismometer, accelerometer, etc.), vibration sensors, etc. The ADSs 520-1-3, 520-2-3, 520-1-4, 520-2-4 can provide various air data reference signals that can be used to determine/compute metrics such as airspeed, Mach number, barometric altitude data, altitude, angle of attack, air temperature, etc.

The communication systems 520-1-5, 520-2-5 can include, for example, satellite communication interfaces, Global Position System (GPS) interfaces, Global Navigation Satellite System (GNSS) interfaces, other wireless interfaces, etc.

The avionics systems 580-1 can generally refer to any electrical or electronic systems used on the aircraft. Examples of avionics systems 580-1 can include communications systems, navigation systems, aviation systems, monitoring systems, control systems, aircraft flight-control systems, collision-avoidance systems, aircraft management systems, weather systems, radar systems, etc.

The displays 580-2-1, 580-2-2 can include display units such as control display units, multifunction displays (MFDs), standby displays, etc.

As is known in the art, the flight control computers 580-2-3, 580-2-4 are part of a flight control system that is used to control the aircraft's engines and flight control surfaces. The flight control computers 580-2-3, 580-2-4 can receive input signals from the inertial reference systems 520-1-1, 520-2-1, 520-3-1, the attitude heading and reference systems (AHRSs) 520-1-2, 520-2-2, air data systems (ADSs) 520-1-3, 520-2-3, 520-1-4, 520-2-4, and other sensors (not illustrated). Examples of input signals can include signals that provide information regarding rates (e.g., angular body rate signals), acceleration signals, altitude signals, attitude signals, speed signals, heading signals, etc. The flight control computer 580-2-3, 580-2-4 also receives pilot input signals from a pilot input system (not illustrated). For example, the pilot input system generates various pilot input signals in response to inputs from the pilot. The pilot input signals can be generated in response to the pilot adjusting a control stick to the left or right, adjusting a control wheel or control stick to the front or back, adjusting a rudder pedal, etc.

The flight control computers 580-2-3, 580-2-4 are configured to control the aircraft's engines by generating, based on the input signals, engine control signals that control the engines of the aircraft.

The flight control computers 580-2-3, 580-2-4 are configured to operate various flight control surfaces e.g., ailerons, elevators, rudder, spoilers, flaps) on the aircraft by issuing control commands to actuator control units that control actuators coupled to the various flight control surfaces to provide a desired flight operation in response to various criteria. Each flight control computer 580-2-3, 580-2-4 process input signals to generate control commands that control the various flight control surfaces of the aircraft. For example, each flight control computer 580-2-3, 580-2-4 processes the pilot input signals and at least some of the input signals received from the IRSs, AHRSs, and ADSs to translate the pilot input signals into commands for use by actuator control units (not illustrated). Each actuator control unit controls one or more actuators associated with various flight control surfaces to control those flight control surfaces.

The other aircraft systems 590-1, 590-2 are any other aircraft systems that receive data, but that do not need to receive "critical" data as described above. Examples of other aircraft systems 590-1, 590-2 can include an Environmental Control System, a Fuel Quantity System, etc.

RDC 540-1 is communicatively coupled directly to various transmitting systems including inertial reference system 520-1-1, air data system 520-1-4, and communication system 520-1-5, to various receiving systems including displays 580-2-1 and other aircraft systems 590-1, and to network switches 550-1, 550-3 that indirectly communicatively couple the RDC 540-1 to avionics systems 580-1, displays 580-2-2, flight control computers 580-2-3, 580-2-4 and other aircraft systems 590-2. RDC 540-1 receives data including critical data from each of these transmitting systems. RDC 540-1 translates all of the data received to generate translated data that is combined and communicated to each of the network switches 550-1, 550-3. The network switches 550-1, 550-3 receive the translated data from the RDC 540-1, determine appropriate destinations (e.g., particular receiving systems, other network switches and/or other RDCs that provide a path to other receiving systems) for the translated data, and then route at least some of the translated data to or toward each destination (e.g., particular receiving systems, other network switches and/or other RDCs that provide a path to other receiving systems).

In one embodiment, RDC 540-3 receives at least some of the translated data from the network switches 550, and performs similar functions as RDCs 240-2 of FIG. 2 by converting at least some of the translated data from one of the network switches to generate converted data having formats used by the receiving systems 580-1, 580-2-1, 595-1. RDC 540-3 can then communicate the converted data to the receiving systems 580-1, 580-2-1, 595-1.

RIU 532-1 is communicatively coupled directly to various transmitting systems including inertial reference systems 520-1-1, 520-3-1, attitude heading and reference system 520-1-2, air data system 520-1-3, and communication systems 520-1-5, to avionics systems 580-1, and to flight control computer 580-2-3.

RIU 532-1 receives critical data directly from each of these transmitting systems 520-1-1, 520-3-1, 520-1-2, 520-1-3, 520-1-5, translates the critical data, and communicates the translated critical data to the processing unit 595-1 at the flight control computer 580-2-3. RIU 532-3 can perform the same functions, but is located in a different part of the aircraft. For example, RIU 532-1 could be located near the front of the aircraft, whereas RIU 532-3 could be located near the back of the aircraft. In one embodiment, RIU 532-3 receives at least some of the translated critical data from the processing unit 595-1, and performs similar functions as RIU 432-2 of FIG. 4 by converting at least some of the translated critical data from the processing unit 595-1 to generate converted data having formats used by the receiving systems 580-1, 580-2-1, 595-1. Although all the links are not illustrated, RIU 532-3 can then communicate the converted data to the receiving systems 580-1, 580-2-1, 595-1.

In the embodiment illustrated in FIG. 5, the processing unit 595-1 is a processor in the flight control computer 580-2-3; however, it should be noted that the processing unit 595-1 does not necessarily have to be part of the flight control computer 580-2-3 and could be implemented at any processor onboard an aircraft. It is illustrated this way in FIG. 5 to show one convenient implementation, but the processing unit 595-1 could also be a processor that is, for example, part of a landing gear control unit (LGCU), a cabin pressure controller (CPC), an environment control system (ECS), a tire pressure monitoring system (TPMS), a brake control unit (BCU), an engine control unit (ECU), a nose wheel steering (NWS) unit, or any other processor onboard an aircraft.

The processing unit 595-1 can then process the translated critical data to extract the critical data, and communicate it directly to the network switch 550-1, and other processing unit 595-2. The network switch 550-1 can perform routing functions to indirectly deliver the critical data over an alternative path to any other receiving system that consumes critical data (e.g., including avionics systems 580-1 and displays 580-2-1, 580-2-2). Thus, as an example, critical data from the ADS 520-1-4 can be delivered to avionics systems 580-1 via one path that includes RDC 540-1 and network switch 550-3, whereas critical data from the ADS 520-1-3 can be delivered to avionics systems 580-1 via another dissimilar path that includes RIU 532-1, processing unit 595-1 and possibly other network switches. As such, the disclosed aircraft data networks can transport critical data over dissimilar paths that are not susceptible to same modes of fault.

RDC 540-2 is communicatively coupled directly to various transmitting systems including inertial reference system 520-2-1, air data system 520-2-4, and communication system 520-2-5, to various receiving systems including displays 580-2-2 and other aircraft systems 590-2, and to network switches 550-2, 550-4 that indirectly communicatively couple the RDS 540-2 to avionics systems 580-1, displays 580-2-1, flight control computers 580-2-3, 580-2-4 and other aircraft systems 590-1. RDC 540-2 receives data including critical data from each of these transmitting systems. RDC 540-2 translates all of the data received to generate translated data that is then combined into one signal that is communicated to each of the network switches 550-2, 550-4. The network switches 550-2, 550-4 receive the translated data from the RDC 540-2, determine appropriate destinations (e.g., particular receiving systems, other network switches and/or other RDCs that provide a path to other receiving systems) for the translated data, and then route at least some of the translated data to or toward each destination (e.g., particular receiving systems, other network switches and/or other RDCs that provide a path to other receiving systems).

In one embodiment, RDC 540-4 receives at least some of the translated data from the network switches 550, and performs similar functions as RDC 240-2 of FIG. 2, and by converting at least some of the translated data to generate converted data having formats used by the receiving systems 580-1, 580-2-2, 595-2. RDC 540-3 can then communicate the converted data to the receiving systems 580-1, 580-2-2, 595-2.

RIU 532-2 is communicatively coupled directly to various transmitting systems including inertial reference system 520-2-1, attitude heading and reference system 520-2-2, air data system 520-2-3, and communication systems 520-2-5, and to flight control computer 580-2-4. RIU 532-2 receives critical data directly from each of these transmitting systems 520-2-1, 520-2-2, 520-2-3, 520-2-5, translates the critical data, and communicates the translated critical data to the processing unit 595-2 at the flight control computer 580-2-4. RIU 532-4 can perform the same functions, but is located in a different part of the aircraft. For example, RIU 532-2 could be located near the front of the aircraft, whereas RIU 532-4 could be located near the back of the aircraft. In one embodiment, RIU 532-4 receives at least some of the translated critical data from the processing unit 595-2, and performs similar functions as RIU 432-2 of FIG. 4 by converting at least some of the translated critical data from the processing unit 595-2 to generate converted data having formats used by the receiving systems 580-1, 580-2-2, 595-2. Although all the links are not illustrated, RIU 532-4 can then communicate the converted data to the receiving systems 580-1, 580-2-2, 595-2.

The processing unit 595-2 does not necessarily have to be part of the flight control computer 580-2-4 and could be implemented at any processor onboard an aircraft. It is illustrated this way in FIG. 5 to show one convenient implementation. The processing unit 595-2 can then process the translated critical data to extract the critical data, and communicate it directly to the network switch 550-2, and other processing unit 595-1. The network switch 550-3 can perform routing functions to indirectly deliver the critical data over an alternative path to any other receiving system that consumes critical data (e.g., including avionics systems 580-1 and displays 580-2-1, 580-2-2). Thus, as an example, critical data from the ADS 520-2-4 can be delivered to avionics systems 580-1 via one path that includes RDC 540-2 and network switch 550-4, whereas critical data from the ADS 520-2-3 can be delivered to avionics systems 580-1 via another dissimilar path that includes RIU 532-2, processing unit 595-2 and possibly other network switches. As such, the disclosed aircraft data networks can transport critical data over dissimilar paths that are not susceptible to same modes of fault.

Those of skill in the art would further appreciate that the various illustrative logical blocks, modules, circuits, described in connection with the embodiments disclosed herein may be implemented as electronic hardware, computer software, or combinations of both. Some of the embodiments and implementations are described above in terms of functional and/or logical block components (or modules). However, it should be appreciated that such block components (or modules) may be realized by any number of hardware, software, and/or firmware components configured to perform the specified functions. To clearly illustrate this interchangeability of hardware and software, various illustrative components, blocks, modules, circuits, have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The word "exemplary" is used exclusively herein to mean "serving as an example, instance, or illustration." Any embodiment described herein as "exemplary" is not necessarily to be construed as preferred or advantageous over other embodiments.

The embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description, it should be appreciated that a vast number of variations exist. For example, although the disclosed embodiments are described with reference to a flight control computer of an aircraft, those skilled in the art will appreciate that the disclosed embodiments could be implemented in other types of computers that are used in other types of vehicles including, but not limited to, spacecraft, submarines, surface ships, automobiles, trains, motorcycles, etc. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed:

1. An aircraft data network, comprising:

a first communication path between a first transmitting system and a first receiving system, comprising:

a first Remote Data Concentrator (RDC) configured to: receive one or more input signals comprising data from the first transmitting system; and translate the data to generate translated data;

a network switch, communicatively coupled to the first RDC via a bus, the network switch being configured to: receive the translated data from the first RDC; determine a destination for at least some of the translated data from the first RDC; and route the at least some of the translated data from the network switch toward the first receiving system;

a second RDC configured to: receive the at least some of the translated data from the network switch; convert the at least some of the translated data from the network switch to generate converted data having a format designed for use by the first receiving system; and communicate the converted data from the second RDC to the first receiving system;

wherein the first RDC, the network switch, and the second RDC collectively define a first hardware and software of the first communication path; and a second communication path between the first transmitting system and the first receiving system, comprising:

a first remote interface unit (RIU) configured to: receive the one or more input signals comprising the data from the first transmitting system; and translate the data to generate translated data;

a processing unit, communicatively coupled to the first RIU, the processing unit being configured to: receive the translated data from the first RIU; determine a destination for at least some of the translated data from the first RIU; and route the at least some of the translated data from the processing unit toward the first receiving system; and a second RIU configured to: receive the at least some of the translated data from the processing unit; convert the at least some of the translated data from the processing unit to generate converted data for use by the first receiving system; and communicate the converted data from the second RIU to the first receiving system, wherein the first RIU, the processing unit, and the second RIU collectively define a second hardware and software of the second communication path, and wherein the first hardware and software of the first communication path is different from the second hardware and software of the second communication path.

2. The aircraft data network according to claim 1, further comprising:

a second receiving system communicatively coupled to the second RDC, wherein the second receiving system is separate and distinct from the first receiving system; and wherein the second RDC is configured to: receive other translated data from the network switch; convert the other translated data to generate other converted data having a format designed for use by the second receiving system, and communicate the other converted data to the second receiving system.

3. The aircraft data network according to claim 2, further comprising:

a third communication path between the first transmitting system and the first receiving system, comprising:

a first wired connection that carries the data from the first transmitting system directly to the first receiving system; and a fourth communication path between the first transmitting system and the second receiving system, the fourth communication path comprising: a second wired connection that carries the data from the first transmitting system directly to the second receiving system.

4. The aircraft data network according to claim 3, further comprising:

a second transmitting system configured to transmit one or more input signals comprising a redundant version of the data, wherein the second transmitting system is separate and distinct from the first transmitting system; and a fifth communication path to the first receiving system, comprising: a third wired connection that carries the redundant version of the data directly from the second transmitting system to the first receiving system; and a sixth communication path between the second transmitting system and the first receiving system, comprising: the first RDC, the network switch and the second RDC.

5. The aircraft data network according to claim 4, further comprising:

a seventh communication path to the second receiving system, comprising:

a fourth wired connection that carries the redundant version of the data from the second transmitting system directly to the second receiving system; and an eighth communication path between the second transmitting system and the second receiving system, comprising: the first RDC, the network switch and the second RDC.

6. The aircraft data network according to claim 1, further comprising: wherein the first RDC comprises hardware and software, and wherein the first RIU comprises hardware and software that is different than the hardware and the software of the first RDC;

wherein the network switch comprises hardware and software, and wherein the processing unit comprises hardware and software that is different than the hardware and the software of the network switch; and wherein the second RDC comprises hardware and software, and wherein the second RIU comprises hardware and software that is different than the hardware and the software of the second RDC.

7. The aircraft data network according to claim 1, wherein the data comprises critical data, wherein the critical data comprises:

communication data that is used by the first receiving system;

navigation data that is used by the first receiving system; or aviation data that is used by the first receiving system.

8. The aircraft data network according to claim 1, wherein the first receiving system comprises: a flight control computer.

9. The aircraft data network according to claim 1, wherein the first receiving system comprises: an avionics system.

10. The aircraft data network according to claim 1, wherein the first receiving system comprises: a display.

11. The aircraft data network according to claim 1, wherein the first transmitting system comprises: a communication system.

12. The aircraft data network according to claim 1, wherein the first transmitting system comprises: an inertial reference system (IRS).

13. The aircraft data network according to claim 1, wherein the first transmitting system comprises: an attitude heading and reference system (AHRS).

14. The aircraft data network according to claim 1, wherein the first transmitting system comprises: an air data system (ADS).

15. An aircraft, comprising:

an aircraft data network, comprising:

a plurality of transmitting systems each being configured to generate signals comprising data, the plurality of transmitting systems comprising: a first transmitting system; a plurality of receiving systems that consume the data, comprising: a first receiving system;

a first communication path between the first transmitting system and the first receiving system, comprising a first Remote Data Concentrator (RDC) configured to: receive one or more input signals comprising the data from the first transmitting system; and translate the data per a network protocol to generate translated data having a format in accordance with the network protocol;

a network switch, communicatively coupled to the first RDC via a bus, the network switch being configured to: receive the translated data from the first RDC; determine a destination for at least some of the translated data from the first RDC; and route the at least some of the translated data from the network switch toward the first receiving system;

a second RDC configured to: receive the at least some of the translated data from the network switch; convert the at least some of the translated data from the network switch to generate converted data having a format designed for use by the first receiving system; and communicate the converted data from the second RDC to the first receiving system, wherein the first RDC, the network switch, and the second RDC collectively define a first hardware and software of the first communication path; and a second communication path between the first transmitting system and the first receiving system, comprising:

a first remote interface unit (RIU) configured to: receive the one or more input signals comprising the data from the first transmitting system; and translate the data to generate translated data;

a processing unit, communicatively coupled to the first RIU, the processing unit being configured to: receive the translated data from the first RIU; determine a destination for at least some of the translated data from the first RIU; and route the at least some of the translated data from the processing unit toward the first receiving system; and a second RIU configured to: receive the at least some of the translated data from the processing unit; convert the at least some of the translated data from the processing unit to generate converted data for use by the first receiving system; and communicate the converted data from the second RIU to the first receiving system, wherein the first RIU, the processing unit, and the second RIU collectively define a second hardware and software of the second communication path, and wherein the first hardware and software of the first communication path is different from the second hardware and software of the second communication path.

16. The aircraft according to claim 15, wherein the data comprises critical data, wherein the critical data comprises:

communication data that is used by the first receiving system;

navigation data that is used by the first receiving system; or aviation data that is used by the first receiving system.

17. The aircraft according to claim 15, wherein the first receiving system comprises:

a flight control computer; an avionics system; or a display.

18. The aircraft according to claim 15, wherein the first transmitting system comprises:

a communication system; an inertial reference system (IRS); an attitude heading and reference system (AHRS); or an air data system (ADS).

19. The aircraft according to claim 15, further comprising: a second receiving system communicatively coupled to the second RDC, wherein the second receiving system is separate and distinct from the first receiving system; and wherein the second RDC is configured to: receive other translated data from the network switch; convert the other translated data to generate other converted data having a format designed for use by the second receiving system, and communicate the other converted data to the second receiving system.

20. The aircraft according to claim 19, further comprising:

a third communication path between the first transmitting system and the first receiving system, comprising:

a first wired connection that carries the data from the first transmitting system directly to the first receiving system;

a fourth communication path between the first transmitting system and the second receiving system, the fourth communication path comprising:

a second wired connection that carries the data from the first transmitting system directly to the second receiving system;

a second transmitting system configured to transmit one or more input signals comprising a redundant version of the data, wherein the second transmitting system is separate and distinct from the first transmitting system;

a fifth communication path to the first receiving system, comprising: a third wired connection that carries the redundant version of the data directly from the second transmitting system to the first receiving system;

a sixth communication path between the second transmitting system and the first receiving system, comprising: the first RDC, the network switch and the second RDC;

a seventh communication path to the second receiving system, comprising: a fourth wired connection that carries the redundant version of the data from the second transmitting system directly to the second receiving system; and an eighth communication path between the second transmitting system and the second receiving system, comprising: the first RDC, the network switch and the second RDC.

* * * * *